(12) United States Patent
Li et al.

(10) Patent No.: US 9,405,143 B2
(45) Date of Patent: Aug. 2, 2016

(54) LIQUID CRYSTAL PANEL, LIQUID CRYSTAL DISPLAY AND METHOD FOR MANUFACTURING THE SAME

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Kun Li, Beijing (CN); Minghua Xuan, Beijing (CN); Young Yik Ko, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 301 days.

(21) Appl. No.: 13/993,365

(22) PCT Filed: Dec. 13, 2012

(86) PCT No.: PCT/CN2012/086506
§ 371 (c)(1),
(2) Date: Jun. 12, 2013

(87) PCT Pub. No.: WO2013/149483
PCT Pub. Date: Oct. 10, 2013

(65) Prior Publication Data
US 2014/0063365 A1    Mar. 6, 2014

(30) Foreign Application Priority Data
Apr. 1, 2012 (CN) .......................... 2012 1 0096492

(51) Int. Cl.
*G02F 1/1333* (2006.01)
*G06F 3/041* (2006.01)
(Continued)

(52) U.S. Cl.
CPC ........ *G02F 1/13338* (2013.01); *G02F 1/13394* (2013.01); *G06F 3/0412* (2013.01);
(Continued)

(58) Field of Classification Search
CPC .......................... G02F 1/13394; G02F 1/13392
See application file for complete search history.

(56) References Cited

U.S. PATENT DOCUMENTS

2005/0219222 A1   10/2005   Johnson et al.
2006/0262099 A1   11/2006   Destura et al.
2011/0001714 A1   1/2011   Sasaki

FOREIGN PATENT DOCUMENTS

CN    1647019 A    7/2005
CN    1839368 A    9/2006
(Continued)

OTHER PUBLICATIONS

First Chinese Office Action dated Jun. 30, 2014; Appln. No. 201210096492.X.

(Continued)

*Primary Examiner* — Phu Vu
(74) *Attorney, Agent, or Firm* — Ladas & Parry LLP

(57) ABSTRACT

Disclosed are a liquid crystal panel, a liquid crystal display and a method for manufacturing the same. The liquid crystal panel comprises: a color filter substrate; an array substrate; a piezoelectric material spacer disposed between the color filter substrate and the array substrate; one signal line disposed between the color filter substrate and the piezoelectric material spacer; and another signal line disposed between the piezoelectric material spacer and the array substrate, wherein the two signal lines respectively contact a color filter substrate side surface and an array substrate side surface of the piezoelectric material spacer, a projection of the signal line at the color filter substrate side onto the array substrate side surface of the piezoelectric material spacer intersects with the signal line at the array substrate side, and the two signal lines are insulated from each other, and it can realize a touch panel with integrated functions and self-applied power source while maintaining the thickness of the liquid crystal cell and which have such advantages as high transmittance, simple structure, low manufacturing costs, high precision and long service life.

20 Claims, 13 Drawing Sheets

(51) Int. Cl.
*G02F 1/1339* (2006.01)
*G02F 1/1362* (2006.01)
(52) U.S. Cl.
CPC . *G02F1/136286* (2013.01); *G02F 2001/13398* (2013.01); *G02F 2001/133394* (2013.01); *G06F 2203/04103* (2013.01)

(56) References Cited

FOREIGN PATENT DOCUMENTS

| CN | 101738763 A | 6/2010 |
| CN | 101943812 A | 1/2011 |
| CN | 102654681 A | 9/2012 |
| CN | 102707470 A | 10/2012 |
| CN | 102707504 A | 10/2012 |

OTHER PUBLICATIONS

International Preliminary Report on Patentabiiity Appln. No. PCT/CN2012/086506: Dated Oct. 1, 2014.

International Search Report mailed Mar. 21, 2013; PCT/CN2012/086506.

Second Chinese Office Action dated Jan. 27, 2015; Appln. No. 201210096492.X.

LIQUID CRYSTAL PANEL, LIQUID CRYSTAL DISPLAY AND METHOD FOR
MANUFACTURING THE SAME

TECHNICAL FIELD

Embodiments of the present invention relate to a liquid crystal panel, a liquid crystal display and a method for manufacturing the same.

BACKGROUND

Thin film transistor liquid crystal displays are optoelectronic products which use thin film transistors as control elements and liquid crystal as medium and which integrates large-scale semiconductor integrated circuits and flat panel light source technologies. With such advantages as low power consumption, convenient portability, application of wide range, high quality and etc., thin film transistor liquid crystal displays become the dominant display products of a new generation.

A touch panel is adopted in the display device in order to allow a user to perform operations while viewing displayed pictures. A touch display screen is one of the important medium integrating an input terminal and an output terminal. With measure of the coordinate positions of touch points on the display screen, the intention of the person who touches the display screen can be obtained according to the displayed contents or patterns corresponding to the coordinate points on the display screen, whereby relevant operations are performed. At present, technologies of resistance type, capacitance type, infrared type, surface sound wave type, etc., are mainly utilized to realize determination of positions of touch points. Usually, touch screens embodying these technologies are separately manufactured first and then are attached to display screens, thus realizing touch control for the display screens. Such touch display screens formed by the touch screens and the display screens which are separately manufactured usually have higher costs and are of greater thickness and weight, which is not helpful to meet the requirements on thin and light display screens. Since the shift amount of overlapping is relatively great during the course of attachment, the touch control positions cannot be precisely located. Attachment of the touch screen to a surface of the display screen will lower the light transmittance of the display screen, and a backlight source with a higher power is required under the same conditions of display brightness.

Since the touch screen and the display screen are separately manufactured before they are assembled together by attachment, the touch display screens in the prior art have the problem that the functions of the touch panel and the display panel are not integrated.

SUMMARY

One embodiment of the present invention provides a liquid crystal panel which comprises: a color filter substrate; an array substrate; a piezoelectric material spacer disposed between the color filter substrate and the array substrate; one signal line disposed between the color filter substrate and the piezoelectric material spacer; and another signal line disposed between the piezoelectric material spacer and the array substrate; the two signal lines respectively contact a color filter substrate side surface and an array substrate side surface of the piezoelectric material spacer, a projection of the signal line at the color filter substrate side onto the array substrate side surface of the piezoelectric material spacer intersects with the signal line at the array substrate side, and the two signal lines are insulated from each other.

A further embodiment of the present invention provides a liquid crystal display, a body of which is provided with the aforesaid liquid crystal panel and a detection circuit, and the detection circuit is connected to the two signal lines to detect whether an electric signal is generated from the two signal lines.

A further embodiment of the present invention provides a method for manufacturing a liquid crystal panel, comprising: forming a first signal line on a first substrate; forming a piezoelectric material spacer on the first signal line, wherein a first substrate side surface of the piezoelectric material spacer contacts the first signal line; forming a second signal line on a second substrate side surface of the piezoelectric material spacer, wherein the second substrate side surface of the piezoelectric material spacer contacts the second signal line, a projection of the first signal line onto the second substrate side surface of the piezoelectric material spacer intersects with the second signal line, and the first signal line and the second signal line are insulated from each other; and assembling the first substrate and the second substrate together to form a cell, wherein the first substrate is one of the color filter substrate and the array substrate, and the second substrate is the other of the color filter substrate and the array substrate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

FIG. 2-1 shows a sectional structure schematic view of the color filter substrate of the thin film transistor liquid crystal display in the embodiment of the present invention;

FIG. 2-2 shows a planar structure schematic view of the color filter substrate of the thin film transistor liquid crystal display in the embodiment of the present invention;

FIG. 4-1 shows a sectional structure schematic view of the color filter substrate after the first conductive signal line is formed in the embodiment of the present invention;

FIG. 4-2 shows a planar structure schematic view of the color filter substrate after the first conductive signal line is formed in the embodiment of the present invention;

FIG. 5-1 shows a sectional structure schematic view of the color filter substrate after the piezoelectric material post spacer protrusion is formed in the embodiment of the present invention;

FIG. 5-2 shows a planar structure schematic view of the color filter substrate after the piezoelectric material post spacer protrusion is formed in the embodiment of the present invention;

FIG. 6-1 shows a structural schematic view of the color filter substrate after the insulating layer is deposited in the embodiment of the present invention;

FIG. 6-2 shows a structural schematic view of the color filter substrate after the insulating layer is processed through photolithography in the embodiment of the present invention;

FIG. 7-1 shows a sectional structure schematic view of the color filter substrate after the second conductive signal line is formed in the embodiment of the present invention;

FIG. 7-2 shows a planar structure schematic view of the color filter substrate after the second conductive signal line is faulted in the embodiment of the present invention;

FIG. 12-1 shows a sectional structure schematic view of the array substrate of the thin film transistor liquid crystal display in the embodiment of the present invention;

FIG. 12-2 shows a planar structure schematic view of the array substrate of the thin film transistor liquid crystal display in the embodiment of the present invention;

FIG. 14-1 shows a sectional structure schematic view of the array substrate after the first conductive signal line is formed in the embodiment of the present invention;

FIG. 14-2 shows a planar structure schematic view of the array substrate after the first conductive signal line is formed in the embodiment of the present invention;

FIG. 15-1 shows a sectional structure schematic view of the array substrate after the piezoelectric material post spacer protrusion is formed in the embodiment of the present invention;

FIG. 15-2 shows a planar structure schematic view of the array substrate after the piezoelectric material post spacer protrusion is formed in the embodiment of the present invention;

FIG. 16-1 shows a structural schematic view of the array substrate after the insulating layer is deposited in the embodiment of the present invention;

FIG. 16-2 shows a structural schematic view of the array substrate after the insulating layer is processed through photolithography in the embodiment of the present invention;

FIG. 17-1 shows a sectional structure schematic view of the array substrate after the second conductive signal line is formed in the embodiment of the present invention;

FIG. 17-2 shows a planar structure schematic view of the array substrate after the second conductive signal line is formed in the embodiment of the present invention;

DETAILED DESCRIPTION

Figure 1:
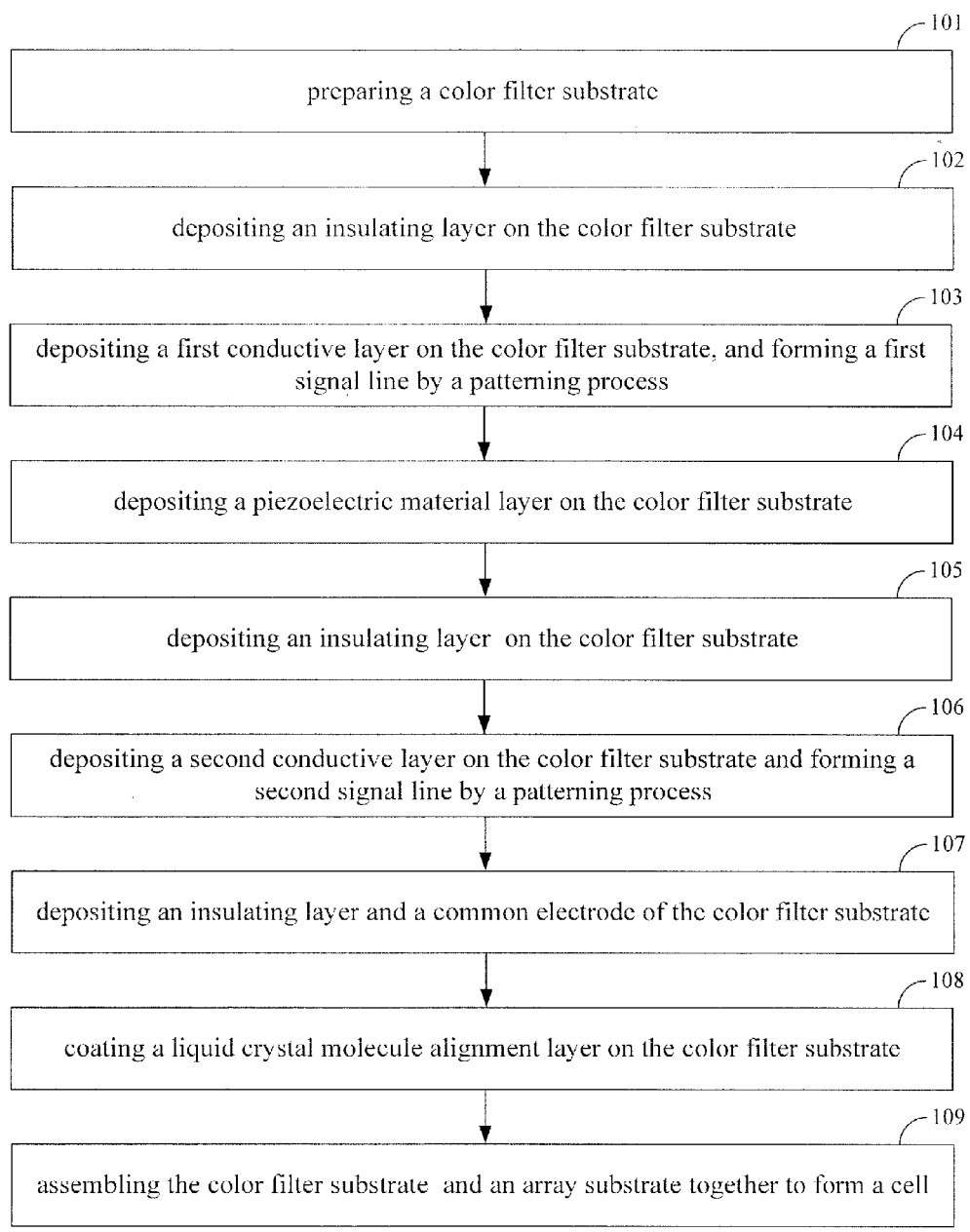
FIG. 1 shows a flow chart of a method for manufacturing a touch control layer on a color filter substrate in an embodiment of the present invention.

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

For the purpose of solving the problem in the prior art that the functions of the touch and the display panels are not integrated, an embodiment of the present invention provides a liquid crystal panel, in which a piezoelectric material spacer and two signal lines are disposed between a color filter substrate and an array substrate. For example, one signal line is disposed between the color filter substrate and the piezoelectric material spacer, and the other signal line is disposed between the piezoelectric material spacer and the array substrate; the two signal lines respectively contacts a color filter substrate side surface and an array substrate side surface of the piezoelectric material spacer, the projection of the signal line at the color filter substrate side onto the array substrate side surface of the piezoelectric material spacer intersects with the signal line at the array substrate side, and the two signal lines are insulated from each other. In the embodiment of the present invention, the color filter substrate may comprise a glass substrate and a black matrix, color pixels and etc. formed on the glass substrate; the array substrate may comprise another glass substrate and gate signal lines, data signal lines and etc. formed on the glass substrate.

Another embodiment of the present invention provides a liquid crystal display, the body of the liquid crystal display is provided with the aforesaid liquid crystal panel and a detection circuit connected to the two signal lines to detect whether electric signals are generated from the two signal lines. In the embodiment of the present invention, for example, the liquid crystal display may be a thin film transistor liquid crystal display, but the embodiment of the present invention is not limited thereto. Hereinafter, the liquid crystal panel and the liquid crystal display in the embodiments of the present invention will be described illustratively with the thin film transistor liquid crystal display being taken as an example.

Hereinafter, the principles of the liquid crystal panel and the liquid crystal display in the embodiments of the present invention will be described in detail.

A thin film transistor liquid crystal display controls orientation of liquid crystal in a liquid crystal cell by applying voltages onto electrodes on an array substrate and a color filter substrate to form an electric field, and controls the light flux through the liquid crystal cell by utilizing such optical properties as optical anisotropy and birefringence, whereby the desired images are obtained. The thickness of the liquid crystal cell formed with the array substrate and the color filter substrate directly affects the light flux through the liquid crystal cell. Therefore, controlling of the thickness of the liquid crystal cell is important for improving the display uniformity of the liquid crystal display and optimizing the display performance.

To maintain the thickness uniformity of the liquid crystal cell of the liquid crystal display is mainly realized by adding spacers with a given height between the array substrate and the color filter substrate. There are various processes for the spacers, one of which is to form post spacers (PSs) on the color filter substrate using a photolithography process and thus use the post spacer protrusions to control the thickness of the liquid crystal cell. Of course, the photolithography process may be used to form spacers of other shapes, e.g., ball spacers, on the color filter substrate. The present embodiment is illustrated by taking post spacers as an example. Since the position, height and profile of post spacers may be precisely controlled by a photolithography process, the liquid crystal display using post spacers is greatly improved in display performance compared with the liquid crystal display using spacers of other shapes.

Under external forces (pressure or pulling force), some materials having asymmetric lattice structures may be changed in profile (i.e., strained). The changes in profile cause locally uneven distribution of electrons inside the material, thus generating a net electric field distribution on the outer surface of the material. On the contrary, when a voltage signal is applied to the material, the material deforms under the effect of the voltage, and the deformation changes along with the externally applied voltage. Such effect is called piezoelectric effect, and the material having piezoelectric effect is called piezoelectric material. The piezoelectric material may be utilized to realize the conversion between electrical energy and mechanical energy.

In the embodiment of the present invention, a post spacer is formed of a piezoelectric material, which may both support the thickness of the liquid crystal cell and determine the touch control position by making direct use of the electric signal generated by external pressure based on the piezoelectric effect and in cooperation with the intersecting signal lines, thus to realize functional integrity of the touch and display panels. On the other hand, when it is not in operation, the piezoelectric material post spacer may be applied with a given voltage to restore its initial height so as to control and stabilize the thickness of the liquid crystal cell.

Therefore, the embodiments of the present invention provide a liquid crystal panel and a liquid crystal display, which may realize a touch panel with integrated functions and self-applied power source while maintaining the thickness of the liquid crystal cell and which have such advantages as high transmittance, simple structure, low manufacturing costs, high precision and long service life.

Hereinafter, the method for manufacturing the liquid crystal panel in the embodiment of the present invention will be described in detail with reference to FIGS. 1 to 19.

Firstly, the embodiment of the method for manufacturing a touch control layer on a color filter substrate will be described in detail with reference to FIGS. 1 to 10. FIG. 1 shows a flow chart of the method for manufacturing the touch control layer on the color filter substrate in the embodiment of the present invention. As shown in FIG. 1, the method comprises, e.g. step 101 to step 109.

Step 101, preparing a color filter substrate.

Figures 1, 2:
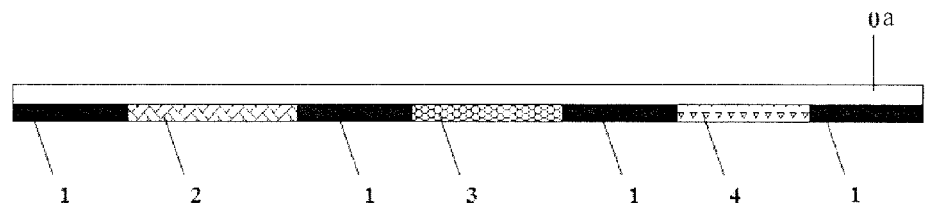
Figure 2:
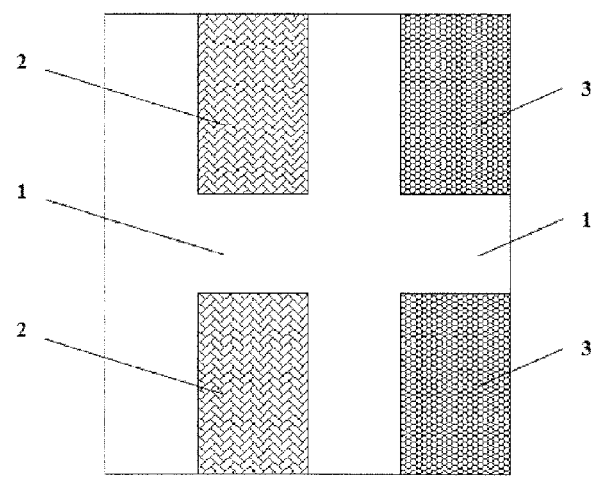

A black matrix 1, a red pixel 2, a green pixel 3 and a blue pixel 4 are formed on a glass substrate 0a, as shown in FIG. 2-1 and FIG. 2-2.

Figure 3:
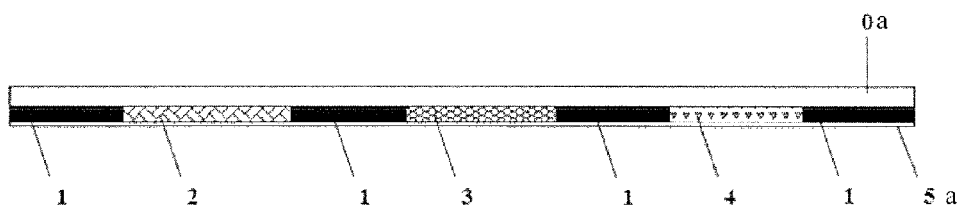
FIG. 3 shows a structural schematic view of the color filter substrate after the insulating layer is deposited in the embodiment of the present invention.

Step 102, depositing an insulating layer 5a on the color filter substrate after step 101, as shown in FIG. 3.

If the black matrix 1 and the color pixel layer are formed of non-conductive materials, step 102 may be omitted.

Step 103, depositing a first conductive layer 6 on the color filter substrate after step 101 or step 102, and forming a first signal line by a patterning process.

Figures 1, 4:
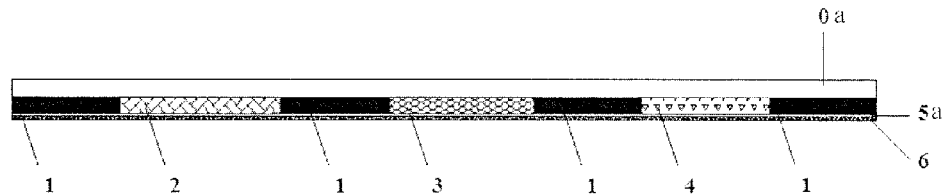
Figures 2, 4:
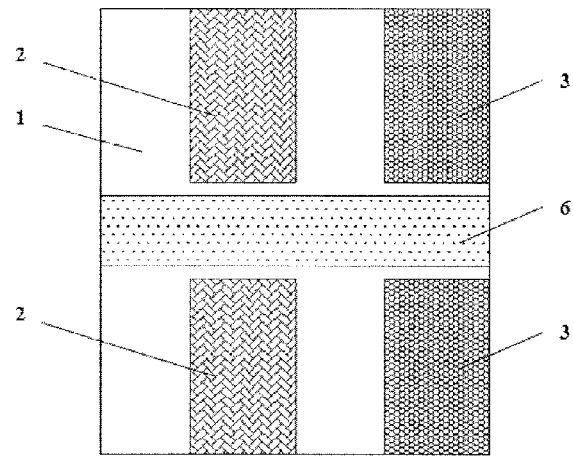

In the embodiment of the present invention, the first conductive layer 6 may be a metal layer or a transparent conductive layer (ITO), or may be formed of another conductive material. The patterning process may include, e.g., a photolithography process, screen printing, etc., as shown in FIG. 4-1 and FIG. 4-2.

Step 104, depositing a piezoelectric material layer 8 on the color filter substrate after step 103, and forming a post spacer protrusion under the first signal line by a patterning process.

Figures 1, 5:
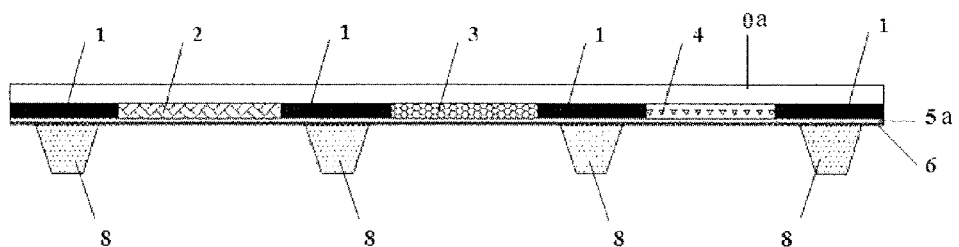
Figures 2, 5:
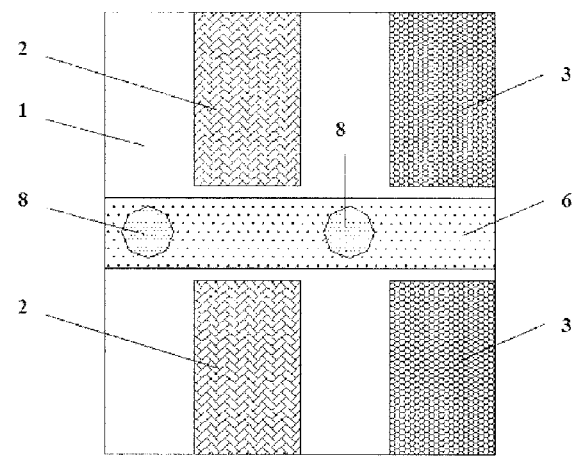

In the embodiment of the present invention, the patterning process may include, e.g., a photolithography process, screen printing, etc.; the post spacer protrusion is a piezoelectric material spacer, as shown in FIG. 5-1 and FIG. 5-2.

In the embodiment of the present invention, the piezoelectric material may be piezoelectric crystal, piezoelectric ceramic, piezoelectric polymer, or piezoelectric ceramic/polymer composite material. In some embodiments of the present invention, the piezoelectric material may be piezoelectric polymer or piezoelectric ceramic/polymer composite material, e.g., polyvinylidene fluoride. Because of its softness, good performance for moulding and good impact resistance, such piezoelectric material can satisfy the requirements of the post spacer protrusion. Furthermore, since such material has relatively high piezoelectric voltage constant, the touch screen manufactured therefrom has high sensitivity.

The post spacer protrusion of a piezoelectric material may be disposed over such a position as a silicon island, a data signal line and a gate signal line of the array substrate, and below the black matrix 1 of the color filter substrate, so as to avoid light leakage and other undesired results caused by abnormal deflection of liquid crystal molecules around the post spacer protrusion. The supporting height of the post spacer protrusion is equal to the desired thickness of the liquid crystal cell. The present embodiment is illustrated with an example that the post spacer protrusion of a piezoelectric material is disposed over an overlapping area of the data signal line and the gate signal line, but the embodiments of the present invention are not limited thereto.

Since the size of a pixel of a liquid crystal display is much smaller than the contact area of a finger or a touch pen, it is possible to exert pressure on a plurality of pixel regions when the touch control operation is performed. In the present embodiment, each pixel region comprises: a red (R) pixel 2, a green (G) pixel 3 and a blue (B) pixel 4, and three black matrixes 1 between the RGB sub pixels. Of course, in the embodiment of the present invention, the pixels may further include another pixel, e.g., yellow pixel, or may have only one black matrix 1. Therefore, it is not necessary that every pixel region is provided with a post spacer protrusion of a piezoelectric material, but that the post spacer protrusion of a piezoelectric material having a sensing effect is disposed within the range of area where the finger or touch pen can exert pressure when the touch control operation is performed, for example, the post spacer protrusion of a piezoelectric material is disposed below a black matrix of a plurality of pixel regions. The present embodiment is illustrated with an example that each of the pixel regions is provided with one post spacer protrusion of a piezoelectric material, but the embodiment of the present invention is not limited thereto.

Figures 1, 6:
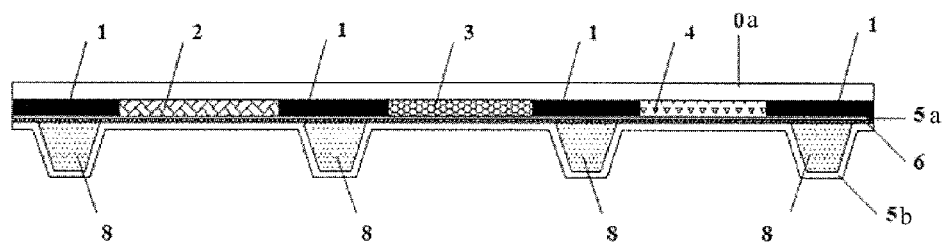
Figures 2, 6:
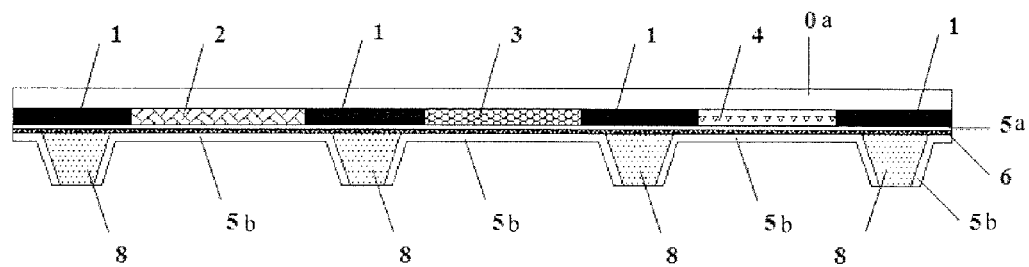

Step 105, depositing an insulating layer 5b on the color filter substrate after step 104, as shown in FIG. 6-1; and forming a via hole by a photolithography process to expose the lower surface of the post spacer protrusion of a piezoelectric material, as shown in FIG. 6-2.

In the present step, the purpose of depositing the insulating layer 5b is to further ensure that the first signal line and the second signal line are insulated from each other. If the first signal line and the second signal line are straight lines, the two conductive signal lines do not intersect with each other on a same plane, but only the projection of the first signal line onto the lower surface of the post spacer protrusion of a piezoelectric material intersects with the second signal line (or the projection of the second signal line onto an upper surface of the post spacer protrusion of a piezoelectric material intersects with the first signal line), and then there is no need to deposit the insulating layer 5b in the present step, and the second signal line is directly formed, which however requires more complex process.

In the embodiment of the present invention, step 104 and step 105 are interchangeable with each other in order. For example, firstly depositing the insulating layer 5b on the substrate after step 103 and forming the via hole in the region of the first signal line by a photolithography process, and then depositing the piezoelectric material layer 8 on the substrate and forming the post spacer protrusion of a piezoelectric material in the position of the via hole by a patterning process. In the embodiment of the present invention, it is only required that the upper surface and the lower surface of the post spacer protrusion of a piezoelectric material respectively contact the first signal line and the second signal line and that the first signal line and the second signal line are insulated from each other.

Step 106, depositing a second conductive layer 7 on the color filter substrate after step 105, and forming a second signal line by a patterning process.

In the embodiment of the present invention, the first conductive layer 6 may be a metal layer or a transparent conductive layer (ITO), or may be formed by another conductive material. The patterning process may include, e.g., photolithography process, screen printing, etc.

Figures 1, 7:
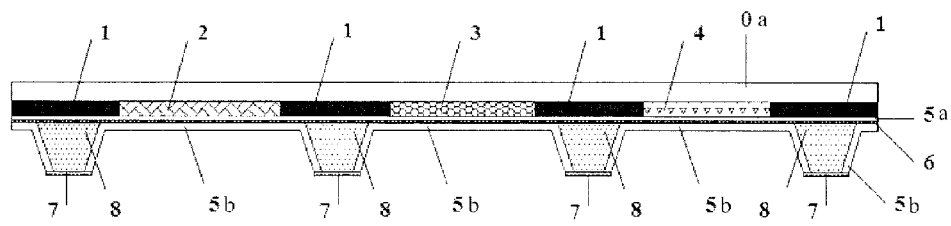
Figures 2, 7:
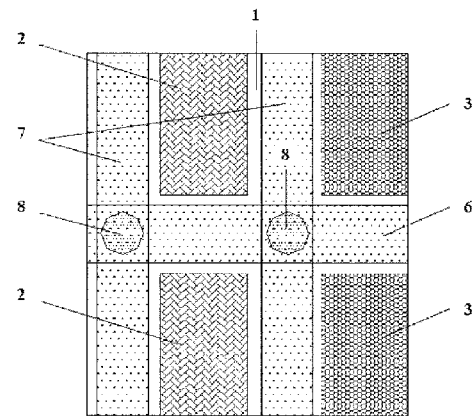

In the embodiment of the present invention, the second signal line is disposed on the lower surface of the post spacer protrusion of a piezoelectric material and arranged in a manner of intersecting with the first signal line at a right angle in a lattice form; the first signal line and the second signal line may be located in any position of the pixel region; in order not to affect the normal display area and aperture ratio, the first signal line and the second signal line may be respectively disposed over the gate signal line and the data signal line so as to dispose the post spacer protrusion of a piezoelectric material over the overlapping area of the data signal line and the gate signal line, i.e., the first signal line is over the gate signal line and the second signal line is over the data signal line, as shown in FIG. 7-1 and FIG. 7-2; or, the first signal line is over the data signal line and the second signal line is over the gate signal line.

Step 107, depositing an insulating layer 5c and a common electrode 9 of the color filter substrate on the color filter substrate after step 106.

Figure 8:
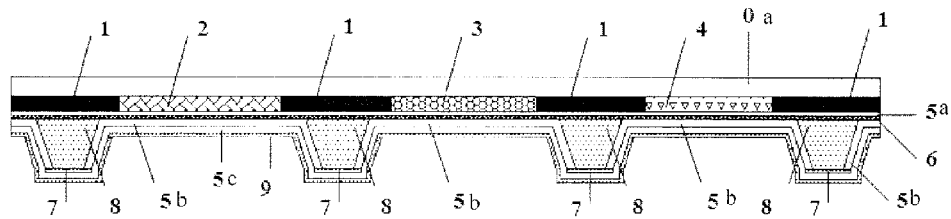
FIG. 8 shows a structural schematic view of the color filter substrate after the insulating layer and the common electrode layer are deposited in the embodiment of the present invention.

In the embodiment of the present invention, the common electrode may or may not be needed according to the required display modes, as shown in FIG. 8.

Figure 9:
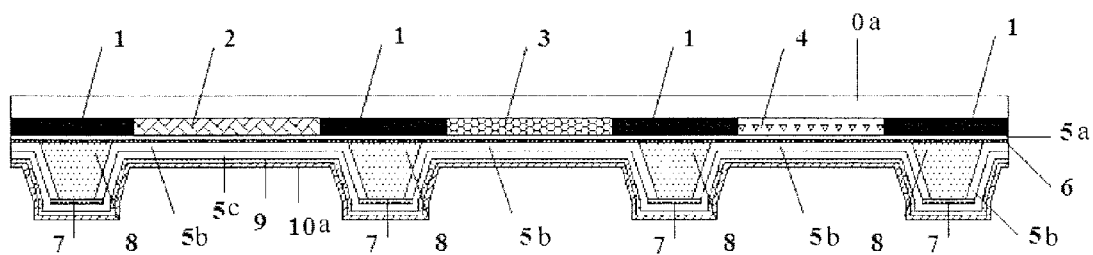
FIG. 9 shows a structural schematic view of the color filter substrate after the liquid crystal molecule alignment layer is deposited in the embodiment of the present invention.

Step 108, coating a liquid crystal molecule alignment layer 10a on the color filter substrate after step 107, as shown in FIG. 9.

Step 109, assembling the color filter substrate after step 108 and an array substrate together to form a cell.

Figure 10:
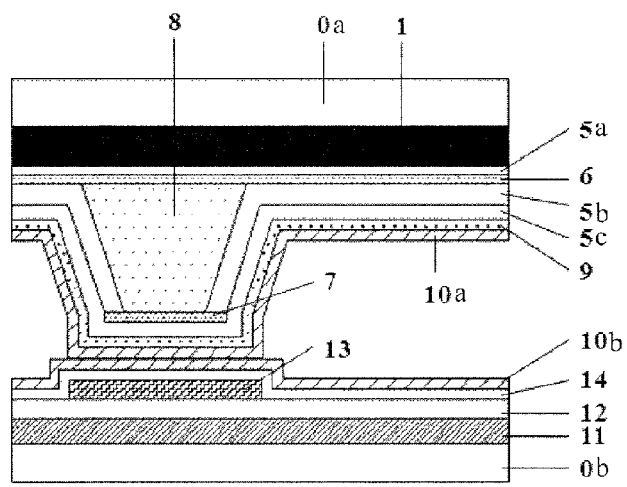
FIG. 10 shows a structural schematic view of the color filter substrate after it is assembled with the array substrate to form a cell in the embodiment of the present invention.

In the embodiment of the present invention, the array substrate may include a glass substrate 0b, a gate signal line metal layer 11, a gate insulating layer 12, a passivation layer 14, a liquid crystal molecule alignment layer 10b, etc., as shown in FIG. 10.

In the embodiment of the present invention, a post spacer protrusion of piezoelectric effect is prepared with a piezoelectric material so as to realize a display substrate with integrated functions, which has a touch panel with high transmittance and self-applied power source. By means of the piezoelectric effect of the post spacer protrusion of a piezoelectric material, the thickness of the liquid crystal cell may be controlled and stabilized.

Figure 11:
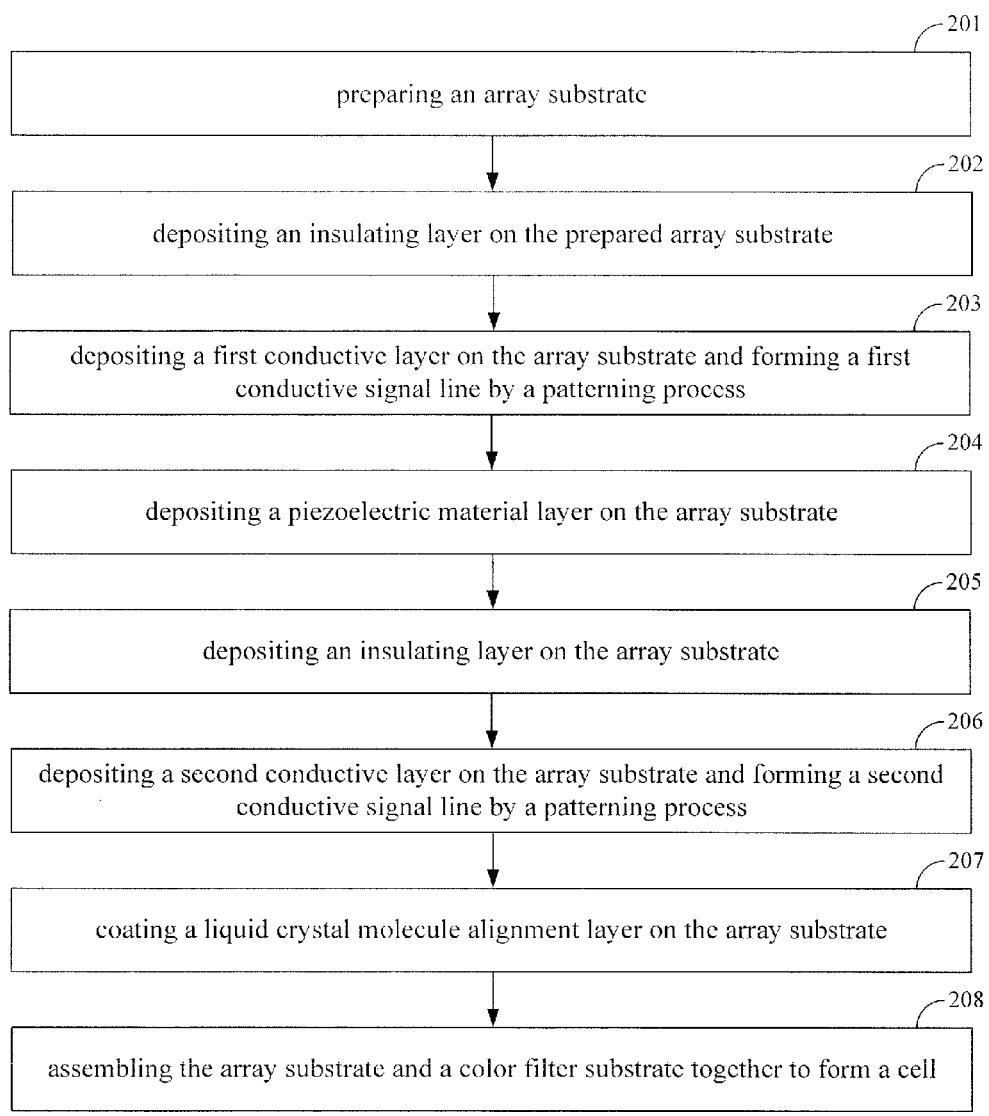
FIG. 11 shows a flow chart of a method for manufacturing a touch control layer on an array substrate in the embodiment of the present invention.

Hereinafter, an embodiment of the method for manufacturing a touch control layer on an array substrate will be described in detail with reference to FIGS. 11 to 19. As shown in FIG. 11, the method comprises, e.g., the following step 201 to step 208.

Step 201, preparing an array substrate.

Figures 1, 12:
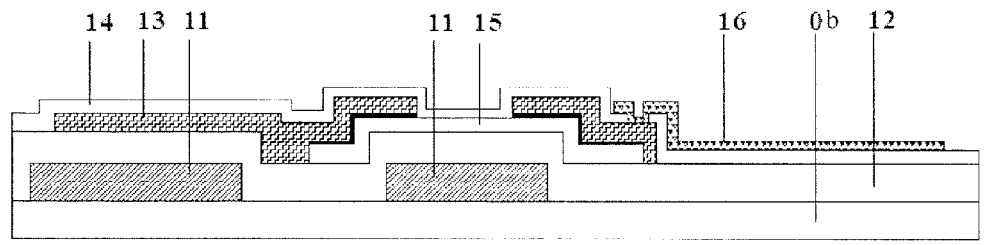
Figures 2, 12:
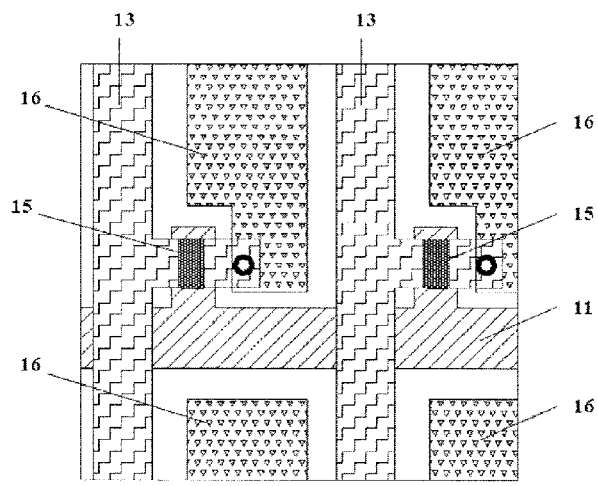

A gate signal line metal layer 11, a gate insulating layer 12, a data signal line metal layer 13, a passivation layer 14, a silicon island 15, a pixel electrode layer 16 and etc. are formed on a glass substrate 0b. In the present embodiment, the array substrate may include the glass substrate 0b, the gate signal line metal layer 11, the gate insulating layer 12, the data signal line metal layer 13, the passivation layer 14, the silicon island 15, the pixel electrode layer 16 and etc., but the embodiment of the present invention are not limited thereto, and another film layer may be added or reduced according to the practical need, as shown in FIG. 12-1 and FIG. 12-2.

Step 202, depositing an insulating layer 5d on the prepared array substrate.

Figure 13:
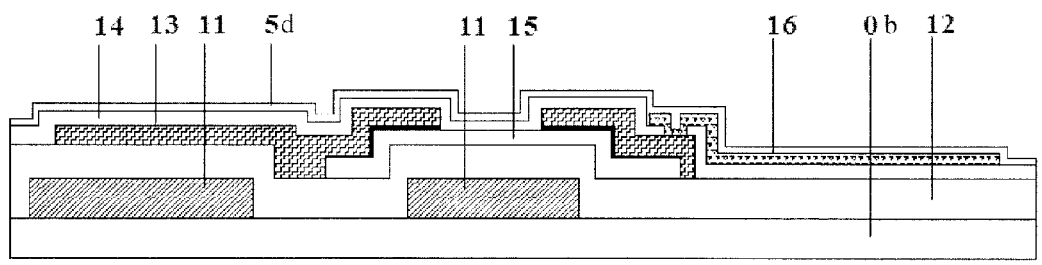
FIG. 13 shows a structural schematic view of the array substrate after the insulating layer is deposited in the embodiment of the present invention.

In the embodiment of the present invention, the purpose of depositing the insulating layer 5d is to prevent the layers having conductive properties on the array substrate from contacting conductive layers of signal lines to be formed subsequently, as shown in FIG. 13.

Step 203, depositing a first conductive layer 6 on the array substrate after step 202, and forming a first conductive signal line by a patterning process.

Figures 1, 14:
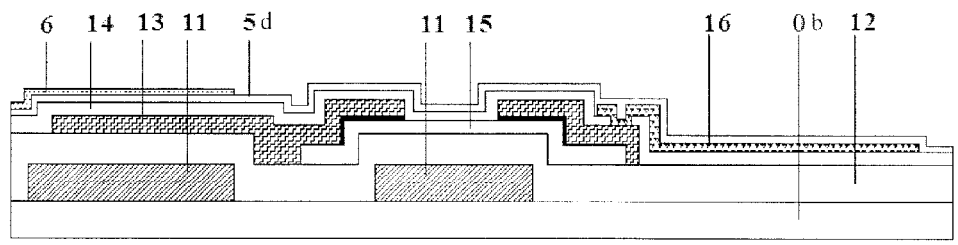
Figures 2, 14:
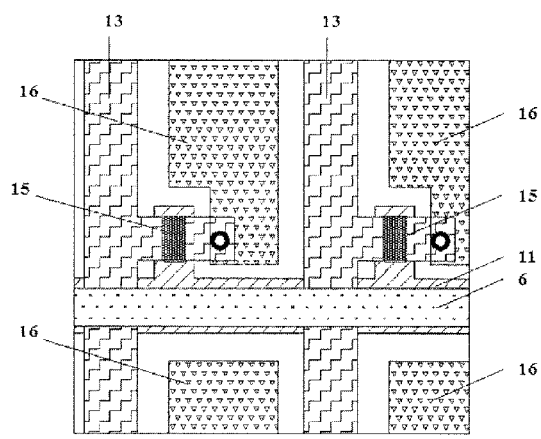

In the embodiments of the present invention, the first conductive layer 6 may be a metal layer or a transparent conductive layer (ITO), or may be formed by another conductive material. The patterning process may include, e.g. photolithography process, screen printing, etc., as shown in FIG. 14-1 and FIG. 14-2.

Figures 1, 15:
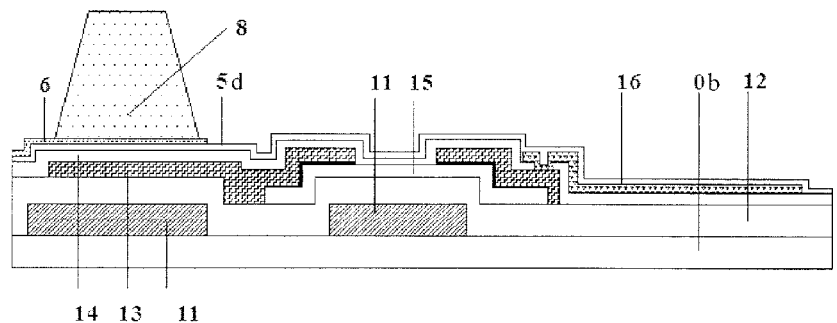
Figures 2, 15:
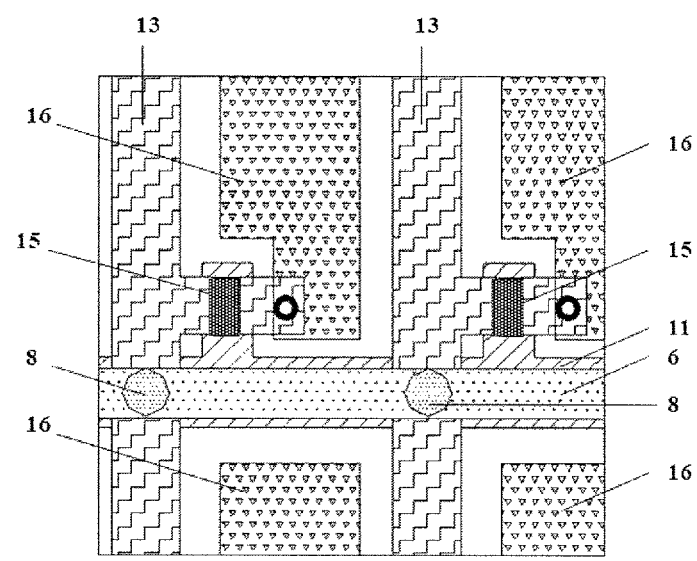

Step 204, depositing a piezoelectric material layer 8 on the array substrate after step 203, and forming a post spacer protrusion on the first conductive signal line by a patterning process, as shown in FIG. 15-1 and FIG. 15-2.

In the embodiment of the present invention, the piezoelectric material may be piezoelectric crystal, piezoelectric ceramic, piezoelectric polymer, or piezoelectric ceramic/polymer composite material. In some embodiments of the present invention, the piezoelectric material may be piezoelectric polymer or piezoelectric ceramic/polymer composite material, e.g., polyvinylidene fluoride. Because of its softness, good performance for moulding and good impact resistance, such piezoelectric material may satisfy the requirements of the post spacer protrusion. Furthermore, since such material has relatively high piezoelectric voltage constant, the touch screen manufactured therefrom has high sensitivity.

The post spacer protrusion of a piezoelectric material may be disposed over such a position as the silicon island, the data signal line or the gate signal line of the array substrate, and below the black matrix of the color filter substrate, so as to avoid light leakage and other undesired results caused by abnormal deflection of the liquid crystal molecules around the post spacer protrusion. The supporting height of the post spacer protrusion is equal to the desired thickness of the liquid crystal cell. The present embodiment is illustrated with an example that the post spacer protrusion of a piezoelectric material is disposed over an overlapping area of the data signal line and the gate signal line, but the embodiment of the present invention is not limited thereto.

Since the size of a pixel a liquid crystal display is much smaller than a contact area of a finger or a touch pen, it is possible to exert pressure on a plurality of pixel regions when the touch control operation is performed. Therefore, it is not necessary that every pixel region is provided with a post spacer protrusion of a piezoelectric material, but that the post spacer protrusion of a piezoelectric material with sensing effect is disposed within the range of area where the finger or touch pen can exert pressure when the touch control operation is performed. The present embodiment is illustrated with an example that each of the pixel regions is provided with one post spacer protrusion of a piezoelectric material, but the embodiment of the present invention is not limited thereto. For example, similar to the aforementioned embodiment, it is possible that a plurality of pixel regions is provided with one post spacer protrusion of a piezoelectric material.

Figures 1, 16:
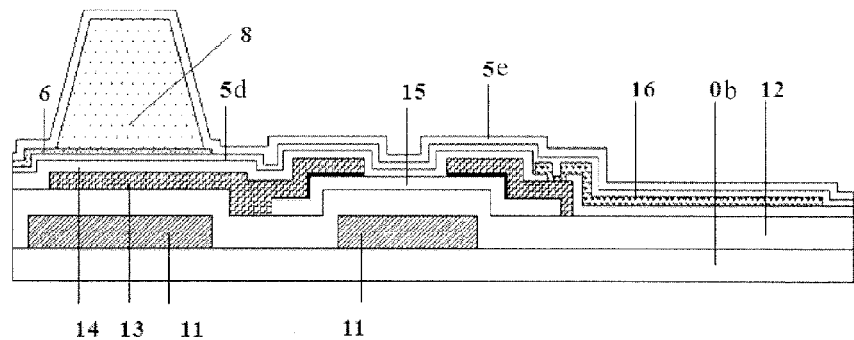
Figures 2, 16:
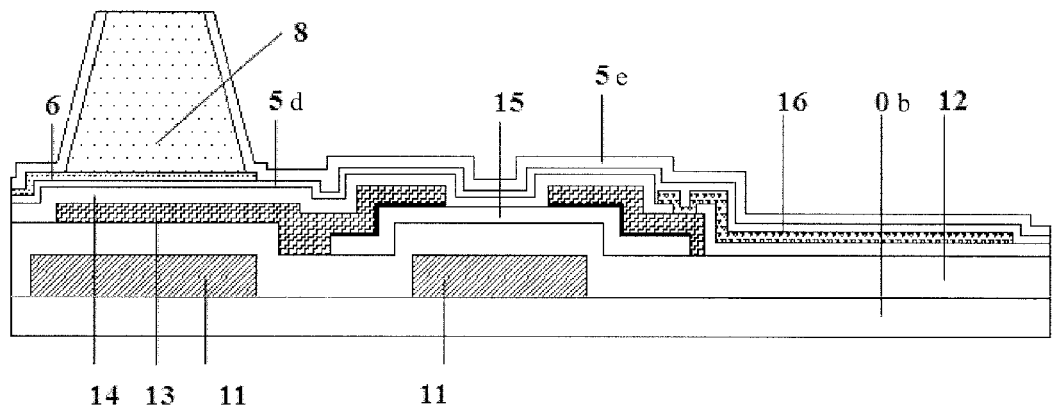

Step 205, depositing an insulating layer 5e on the array substrate after step 204, and forming a via hole by a patterning process (e.g. photolithography process) to expose the upper surface of the post spacer protrusion of a piezoelectric material, as shown in FIG. 16-1 and FIG. 16-2.

Similar to the aforementioned embodiment, step 204 and step 205 are interchangeable with each other in order. It is only required that the upper surface and the lower surface of the post spacer protrusion of a piezoelectric material respectively contact the second conductive signal line and the first conductive signal line and that the first conductive signal line and the second conductive signal line are insulated from each other.

Step 206, depositing a second conductive layer 7 on the array substrate after step 205, and forming a second conductive signal line by a patterning process.

In the embodiment of the present invention, the second conductive layer 7 may be a metal layer or a transparent conductive layer (ITO), or may be formed of another conductive material.

Figures 1, 17:
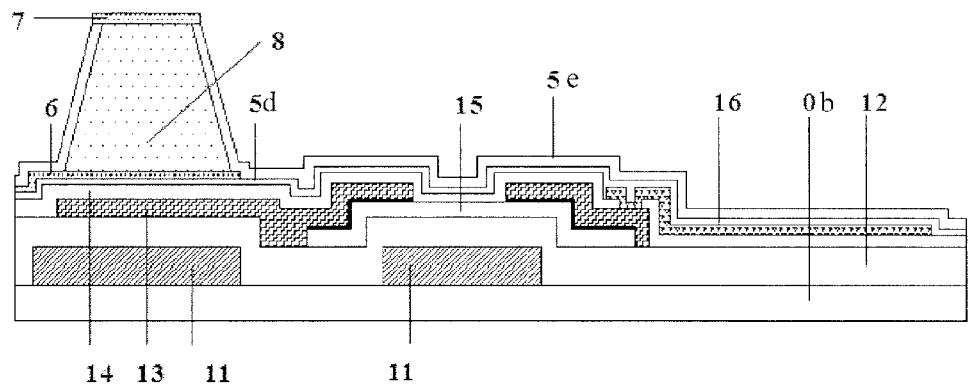
Figures 2, 17:
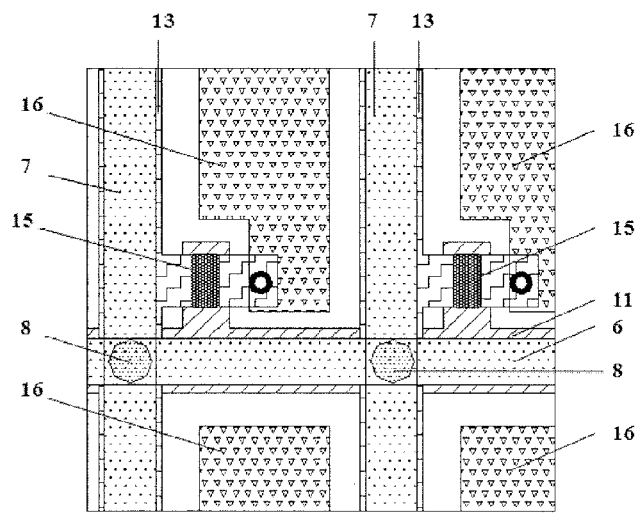

In the embodiment of the present invention, the second conductive signal line is disposed on the upper surface of the post spacer protrusion of a piezoelectric material and arranged in a manner of intersecting with the first conductive signal line at a right angle in a lattice form; the first conductive signal line and the second conductive signal line may be located in any position of the pixel region; in order not to affect the normal display area and aperture ratio, the first signal line and the second signal line may be disposed over the gate signal line and the data signal line respectively, so as to dispose the post spacer protrusion of a piezoelectric material over the overlapping area of the data signal line and the gate signal line; i.e., the first conductive signal line is over the gate signal line and the second conductive signal line is over the data signal line, as shown in FIG. 17-1 and FIG. 17-2; or, the first conductive signal line is over the data signal line and the second conductive signal line is over the gate signal line.

Figure 18:
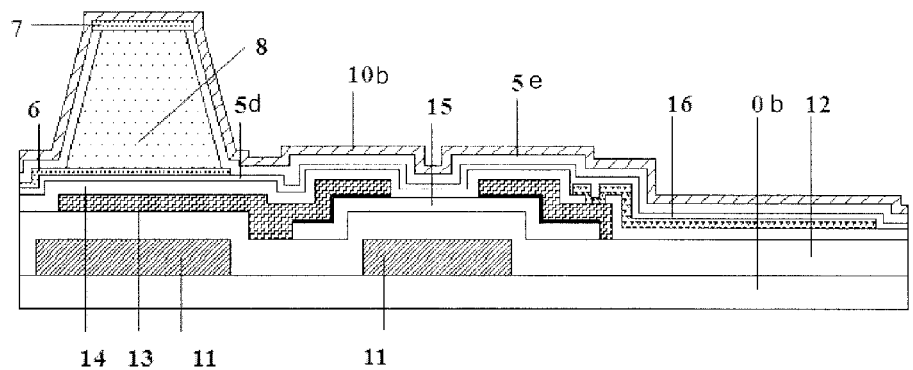
FIG. 18 shows a structural schematic view of the array substrate after the liquid crystal molecule alignment layer is deposited in the embodiment of the present invention.

Step 207, coating a liquid crystal molecule alignment layer 10b on the array substrate after step 206, as shown in FIG. 18.

Step 208, assembling the array substrate after step 208 and a color filter substrate together to form a cell.

Figure 19:
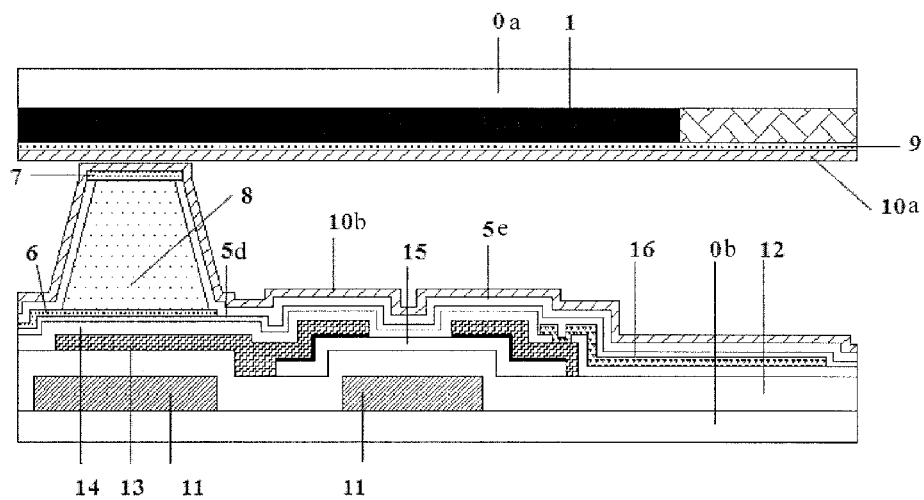
FIG. 19 shows a structural schematic view of the array substrate after being assembled with the color filter substrate to form a cell in the embodiment of the present invention.

In the embodiment of the present invention, the color filter substrate may include: the black matrix 1 formed on the glass substrate 0a, the RGB sub pixels, the common electrode 9 and the liquid crystal molecule alignment layer 10a, as shown in FIG. 19.

In the liquid crystal display screens manufactured by the embodiments of the present invention, because the initial height supported by the post spacer protrusion of a piezoelectric material is the thickness of the liquid crystal cell, the post spacer protrusion does not deform and no electric signal is generated when there is no operation (no touching). When the screen is touched by a finger or a touch pen, downward pressure is applied to the liquid crystal cell, whereby the post spacer protrusion of a piezoelectric material deforms under the pressure perpendicular to the screen, producing a net electric field on the upper surface and the lower surface of the post spacer protrusion of a piezoelectric material. Through detection a peripheral voltage detecting system connected to the first conductive signal line and the second conductive signal line, the first conductive signal line generating a signal and the second conductive signal line generating a signal are determined and the position of the touch point is obtained. Thus, the intention of the person who touches the display screen is obtained according to the displayed content or pattern corresponding to the coordinate point on the display screen, whereby a relative operation can be performed. On the other hand, after the touch control operation is finished, a given voltage is applied to the post spacer protrusion of a piezoelectric material, and therefore the protrusion restores its initial height to control and stabilize the thickness of the liquid crystal cell. In this case, such undesired effects are avoided as permanent deformation due to the pressure of constant touches on the post spacer protrusion of a traditional material, unstable thickness of the liquid crystal cell, display unevenness of the liquid crystal display, etc. Therefore, there is provided a display substrate, which can realize a touch panel with integrated functions and self-applied power source while maintaining the thickness of the liquid crystal cell and which has such advantages as high transmittance, simple structure, low manufacturing costs, high precision and long service life.

The above embodiments are used for illustrating the technical solutions of the present invention only and not limitative to the scope of the disclosure. While the present invention has been detailedly described with reference to the foregoing embodiments, it shall be understood by those skilled in the art that any amendment to the technical solutions or substitution for some of the technical features shall also be allowed without departing from the scope and spirit of the present invention.

The invention claimed is:

1. A liquid crystal panel, comprising:
a color filter substrate;
an array substrate;
a piezoelectric material spacer disposed between the color filter substrate and the array substrate;
one signal line disposed between the color filter substrate and the piezoelectric material spacer; and
another signal line disposed between the piezoelectric material spacer and the array substrate,
wherein the two signal lines respectively contact a color filter substrate side surface and an array substrate side surface of the piezoelectric material spacer, a projection of the signal line at the color filter substrate side onto the array substrate side surface of the piezoelectric material spacer intersects with the signal line at the array substrate side, and the two signal lines are insulated from each other; and the piezoelectric material spacer is configured for producing an electric signal under an external pressure, and the two signal lines transmit the electric signal.

2. The liquid crystal panel according to claim 1, wherein an insulating layer is disposed between the signal line at the color filter substrate side and the array substrate and another insulating layer is disposed between the signal line at the array substrate side and the color filter substrate.

3. The liquid crystal panel according to claim 1, wherein the piezoelectric material for the piezoelectric material spacer is one of piezoelectric crystal, piezoelectric ceramic, piezoelectric polymer, and piezoelectric ceramic/polymer composite material.

4. The liquid crystal panel according to claim 1, wherein the piezoelectric material spacer is disposed between an area where a silicon island, a data signal line or a gate signal line of the array substrate is located and an area where a black matrix of the color filter substrate is located.

5. The liquid crystal panel according to claim 4, wherein the piezoelectric material spacer s disposed between an overlapping area of the data signal line and the gate signal line and the area where the black matrix of the color filter substrate is located.

6. The liquid crystal panel according to claim 4, wherein the piezoelectric material spacer is disposed below one black matrix of a plurality of pixel regions, each of the pixel regions including a plurality of sub pixels and black matrixes disposed between the sub pixels.

7. The liquid crystal panel according to claim 1, wherein a liquid crystal molecule alignment layer is disposed between the signal line at the array substrate side and the array substrate.

8. The liquid crystal panel according to claim 7, wherein the black matrix and color pixel layers on the color filter substrate are formed of conductive materials, and an insulating layer is disposed between the signal line at the color filter substrate side and the color filter substrate.

9. The liquid crystal panel according to claim 1, wherein a liquid crystal molecule alignment layer is disposed between the signal line at the color filter substrate side and the color filter substrate.

10. The liquid crystal panel according to claim 9, wherein an insulating layer is disposed between the signal line at the array substrate side and the array substrate.

11. A liquid crystal display, a body of which is provided with the liquid crystal panel according to claim 1 and a detection circuit, the detection circuit being connected to the two signal lines to detect whether an electric signal is generated from the two signal lines.

12. A method for manufacturing a liquid crystal panel, comprising:
  forming a first signal line on a first substrate;
  forming a piezoelectric material spacer on the first signal line, a first substrate side surface of the piezoelectric material contacting the first signal line;
  forming a second signal line on a second substrate side surface of the piezoelectric material spacer, wherein the second substrate side surface of the piezoelectric material spacer contacts the second signal line, a projection of the first signal line onto the second substrate side surface of the piezoelectric material spacer intersects with the second signal line, and the first signal line and the second signal line are insulated from each other; and
  assembling the first substrate and the second substrate together to form a cell, wherein the first substrate is one of a color filter substrate and an array substrate, and the second substrate is the other of the color filter substrate and the array substrate;
  wherein the piezoelectric material spacer is configured for producing an electric signal under an external pressure, and the two signal lines transmit the electric signal.

13. The method for manufacturing a liquid crystal panel according to claim 12, wherein forming the first signal line on the first substrate comprises:
  forming an insulating layer on the first substrate; and
  forming the first signal line on the insulating layer.

14. The method for manufacturing a liquid crystal panel according to claim 12, wherein forming the first signal line on the first substrate comprises:
  depositing a first conductive layer on the first substrate, and forming the first signal line by a patterning process; and
  wherein forming the second signal line on the second substrate side surface of the piezoelectric material spacer comprises:
  depositing a second conductive layer on the first substrate having been formed with a protrusion of the spacer; and
  forming a second signal line by a patterning process at the protrusion of spacer.

15. The method for manufacturing a liquid crystal panel according to claim 14, wherein forming the piezoelectric material spacer on the first signal line comprises:
  depositing an insulating layer on the first substrate having been formed with the first signal line;
  forming a via hole by a patterning process in the area where the first signal line is located;
  depositing a piezoelectric material to form a piezoelectric material layer; and
  forming a protrusion of the piezoelectric material spacer by a patterning process in the position of the via hole.

16. The method for manufacturing a liquid crystal panel according to claim 14, wherein forming the piezoelectric material spacer on the first signal line comprises:
  directly depositing a piezoelectric material on the first substrate having been formed with the first signal line, so as to form a piezoelectric material layer; and
  forming a protrusion of the piezoelectric material spacer by a patterning process in the area where the first signal line is located,
  wherein depositing the second conductive layer on the first substrate having been formed with a protrusion of the spacer comprises:
  depositing an insulating layer on the first substrate formed with the protrusion of the spacer;
  forming a via hole by a patterning process at the protrusion of the spacer; and
  depositing the second conductive layer.

17. The method for manufacturing a liquid crystal panel according to claim 12, wherein, after forming the second signal line on the second substrate side surface of the piezoelectric material spacer and prior to assembling the first substrate and the second substrate together to form a cell, the method further comprises:
  coating a liquid crystal molecule alignment layer on the first substrate formed with the second signal line.

18. The liquid crystal panel according to claim 1, wherein the liquid crystal panel comprises a common electrode and a pixel electrode layer, and the two signal lines are insulated from the common electrode and the pixel electrode layer.

19. The liquid crystal panel according to claim 1, wherein after a touch control operation is finished, the piezoelectric material spacer is applied with a voltage to restore its initial height.

20. The method for manufacturing a liquid crystal panel according to claim 12, wherein after a touch control operation is finished, the piezoelectric material spacer is applied with a voltage to restore its initial height.

* * * * *